US008744069B2

(12) United States Patent  
Cutler

(10) Patent No.: US 8,744,069 B2  
(45) Date of Patent: Jun. 3, 2014

(54) REMOVING NEAR-END FREQUENCIES FROM FAR-END SOUND

(75) Inventor: Ross Cutler, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1300 days.

(21) Appl. No.: 11/953,767

(22) Filed: Dec. 10, 2007

(65) Prior Publication Data

US 2009/0147938 A1 Jun. 11, 2009

(51) Int. Cl.
H04M 9/08 (2006.01)

(52) U.S. Cl.
USPC .................................................. 379/406.01

(58) Field of Classification Search
USPC ............. 379/406.01, 388.4–388.07, 391, 392
See application file for complete search history.

(56) References Cited

U.S. PATENT DOCUMENTS

| 3,118,340 | A | | 1/1964 | Iwerks et al. |
| 5,271,057 | A | | 12/1993 | Addeo et al. |
| 5,561,668 | A | | 10/1996 | Genter |
| 5,587,998 | A | | 12/1996 | Velardo, Jr. et al. |
| 5,796,819 | A | | 8/1998 | Romesburg |
| 6,044,341 | A | * | 3/2000 | Takahashi .................... 704/226 |
| 6,442,272 | B1 | | 8/2002 | Osovets |
| 6,611,601 | B2 | | 8/2003 | Terada et al. |
| 6,842,516 | B1 | | 1/2005 | Armbruster |
| 6,868,157 | B1 | | 3/2005 | Okuda |
| 6,922,403 | B1 | | 7/2005 | Yoo |
| 6,968,064 | B1 | | 11/2005 | Ning |
| 6,970,796 | B2 | | 11/2005 | Tashev |
| 6,987,856 | B1 | | 1/2006 | Feng et al. |
| 7,010,119 | B2 | | 3/2006 | Marton et al. |
| 7,020,337 | B2 | | 3/2006 | Viola et al. |
| 7,031,499 | B2 | | 4/2006 | Viola et al. |
| 7,039,199 | B2 | | 5/2006 | Rui |
| 7,099,510 | B2 | | 8/2006 | Jones et al. |
| 7,127,071 | B2 | | 10/2006 | Rui et al. |
| 7,197,186 | B2 | | 3/2007 | Jones et al. |
| 7,212,651 | B2 | | 5/2007 | Viola et a |
| 7,242,763 | B2 | | 7/2007 | Etter |
| 2002/0172350 | A1 | | 11/2002 | Edwards et al. |
| 2004/0001137 | A1 | | 1/2004 | Cutler et al. |
| 2004/0101038 | A1 | * | 5/2004 | Etter ............................. 375/222 |
| 2004/0120510 | A1 | | 6/2004 | LeBlanc |

(Continued)

FOREIGN PATENT DOCUMENTS

JP 1996125835 5/1996

OTHER PUBLICATIONS

Fredrick Lindstrom, et al., A Hybrid Acoustic Echo Canceller and Suppressor, Science Direct, Jul. 6, 2006, pp. 739-749.

(Continued)

Primary Examiner — Sonia Gay  
(74) Attorney, Agent, or Firm — Andrew Smith; Micky Minhas

(57) ABSTRACT

By-bandwidth voice-switching is performed during double-talk between a near-end teleconference device and a far-end teleconference device. This may involve receiving far-end voice data from the far-end teleconference device. Near-end voice data is also received at the near-end teleconference device. Frequency subbands of the near-end voice data that having substantial energy are identified. Before playing the far-end voice data on one or more loudspeakers of the near-end teleconference device, frequency subbands from the far-end voice data frequency subbands thereof that correspond to the identified frequency subbands of the near-end voice data are attenuated and/or eliminated.

27 Claims, 8 Drawing Sheets

(56) References Cited

U.S. PATENT DOCUMENTS

| | | | |
|---|---|---|---|
| 2004/0170164 A1* | 9/2004 | LeBlanc et al. | 370/389 |
| 2004/0228215 A1 | 11/2004 | Ichikawa et al. | |
| 2004/0228474 A1 | 11/2004 | Taniguchi et al. | |
| 2004/0252845 A1 | 12/2004 | Tashev | |
| 2004/0263636 A1* | 12/2004 | Cutler et al. | 348/211.12 |
| 2005/0037782 A1* | 2/2005 | Diethorn et al. | 455/462 |
| 2005/0157866 A1 | 7/2005 | Marton | |
| 2006/0018457 A1* | 1/2006 | Unno et al. | 379/388.04 |
| 2006/0147063 A1 | 7/2006 | Chen | |
| 2006/0233353 A1 | 10/2006 | Beaucoup et al. | |
| 2006/0239443 A1 | 10/2006 | Oxford et al. | |
| 2007/0036343 A1 | 2/2007 | Sudo et al. | |
| 2007/0189507 A1* | 8/2007 | Tittle et al. | 379/406.01 |
| 2007/0189547 A1* | 8/2007 | Hsu et al. | 381/71.1 |
| 2007/0263849 A1 | 11/2007 | Stokes et al. | |
| 2008/0107281 A1* | 5/2008 | Togami et al. | 381/66 |
| 2008/0219431 A1* | 9/2008 | Liu et al. | 379/406.01 |
| 2008/0273683 A1* | 11/2008 | Cohen et al. | 379/202.01 |

OTHER PUBLICATIONS

Miket DSP Solutions, Acoustic Echo Canceller Data Sheet, pp. 1-49.

Saeed Vaseghi, Echo Cancellation, pp. 1-20.

Amit S. Chhetri et al., Regression-Based Residual Acoustic Echo Suppression, Sep. 12-15, 2005, pp. 1-4.

Fredrick Lindstrom, Improving the Performance of a Low-Complexity Doubletalk Detector by a Subband Approach, pp. 1-5, Sweden.

Koen Eneman, et al., Real-Time Implementation of an Acoustic Echo Canceller, May 1998, pp. 1-7, Italy.

"Acoustic Echo Canceller Demo using the Block Frequency Domain Adaptive Filter Algorithm", http://www.dspalgorithms.com/bfdafaec/bfdafaec11.html.

Rick, et al., "Integration of Automatic Microphone Selection with Acoustic Echo Cancellation", Date: Oct. 1996, http://www.aes.org/e-lib/browse.cfm?elib=10220.

Wang, et al., "Voice Source Localization for Automatic Camera Pointing System in Videoconferencing", Applications of Signal Processing to Audio and Acoustics, Date: Oct. 1997, Issue: 19-22, p. 4.

* cited by examiner

REMOVING NEAR-END FREQUENCIES FROM FAR-END SOUND

BACKGROUND

Videoconferencing systems are used to allow real-time visual and voice communication between participants. For purpose of discussion, the different ends of a videoconference are referred to as near-end and far-end. The near-end is a local frame of reference, and the far-end is a remote frame of reference. Typically the near-end and the far-end have respective video and audio equipment through which near-end and far-end participants communicate. Some videoconferencing devices are able to automatically detect who is actively speaking, locally, by analyzing captured video and audio data. Detecting the active speaker can enable a number of features such as automatic panning and zooming (either physically or virtually), displaying information to help a viewer identify the active speaker, transcribing information about who said what during a videoconference, and others.

While an active speaker can be detected using only analysis of video data, active speaker detection can be improved by also using audio data. A videoconferencing device may be provided with a microphone array, and time-delay analysis can be used to calculate likely directions from which sound arrived at the microphone array (called sound source localization). However, videoconferencing devices also have one or more loudspeakers for playing sound received from the far-end. While the incoming far-end sound signal can be used to detect and cancel some of the far-end sound captured by the near-end microphone array, this echo cancellation is imperfect and the audio data captured by the near-end microphone may include significant levels of sound from the far-end (as played on the near-end loudspeakers). This leakage can cause a number of problems observed only by the present inventors. For example, it can make the sound source localization return false positives, which can cause automatic panning and zooming to pan/zoom to an inactive speaker or worse. The sound source localization may become unavailable. The leakage of course can also create audible echo at the far-end.

Techniques discussed below relate to dealing with far-end sound in teleconferencing devices.

SUMMARY

The following summary is included only to introduce some concepts discussed in the Detailed Description below. This summary is not comprehensive and is not intended to delineate the scope of the claimed subject matter, which is set forth by the claims presented at the end.

By-bandwidth voice-switching is performed during doubletalk between a near-end teleconference device and a far-end teleconference device. This may involve receiving far-end voice data from the far-end teleconference device. Near-end voice data is also received at the near-end teleconference device. Frequency subbands of the near-end voice data that having substantial energy are identified. Before playing the far-end voice data on one or more loudspeakers of the near-end teleconference device, frequency subbands from the far-end voice data frequency subbands thereof that correspond to the identified frequency subbands of the near-end voice data are attenuated and/or eliminated.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to dealing with far-end sound, or effects thereof, in a teleconferencing system. Three embodiments are discussed, including an embodiment relating to determining when sound source localization for a microphone array may be detecting a loudspeaker and controlling use of sound source localization accordingly. Another embodiment involves selectively omitting various bands of far-end frequency from audio data received from a microphone array before performing sound source localization thereon. Yet another embodiment relates to subband-based voice switching, namely, removing portions of far-end sound data that are in frequency bands where near-end speech is occurring.

Identifying Predomination of Far-End Sound

Figure 1:
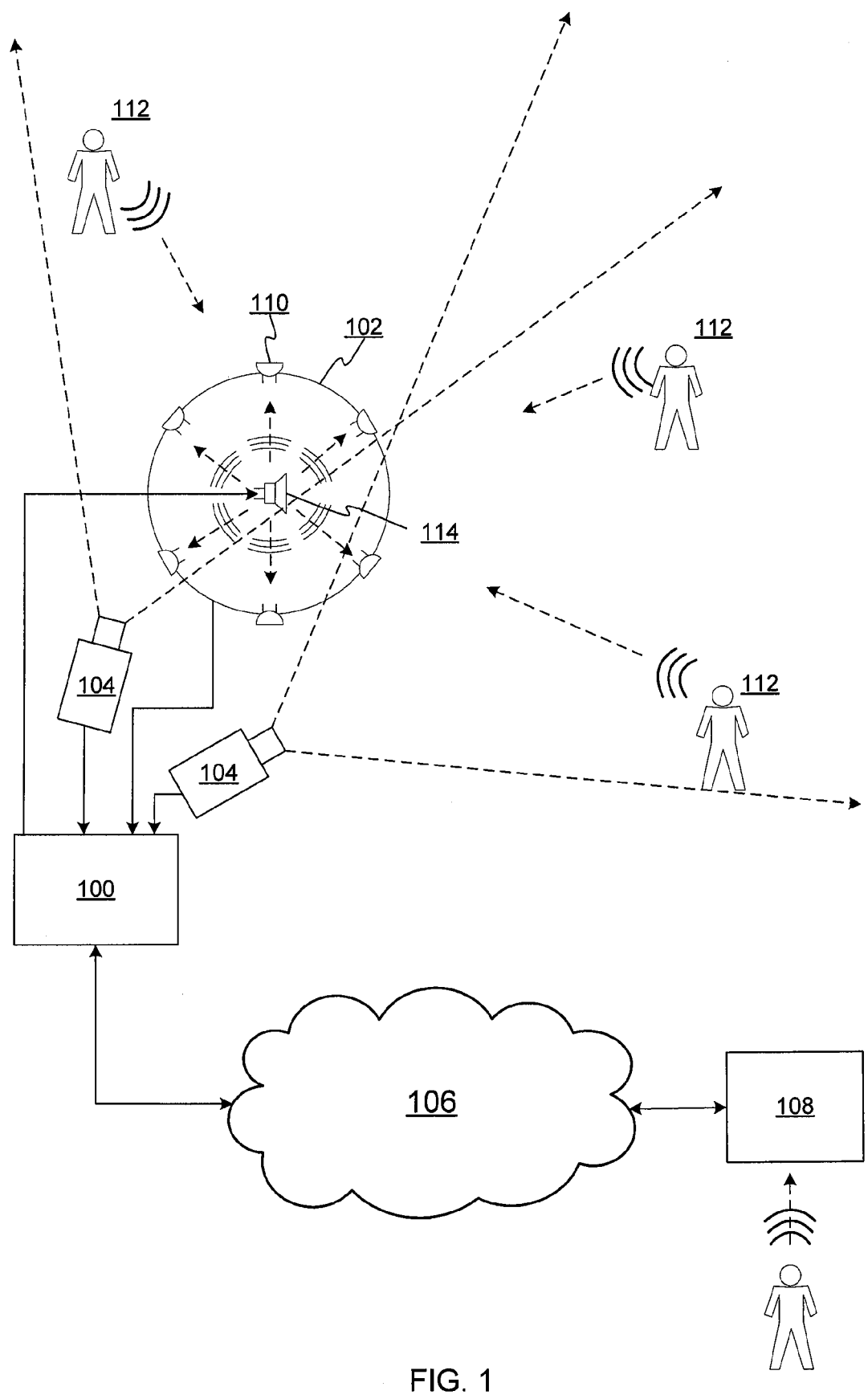
FIG. 1 shows a near-end teleconference device with a microphone array and video cameras.

FIG. 1 shows a near-end teleconference device 100 with a microphone array 102 and video cameras 104. The near-end teleconference device 100 is configured to communicate over a network 106 and exchange audio and/or video signal data with a far-end device 108. The network 106 can be a data network, a switched circuit network (e.g. POTS), or a combination thereof. The far-end device 108 need not have video capabilities, and for some embodiments discussed herein the near-end teleconference device 100 also may not have video capabilities.

The example microphone array 102 in FIG. 1 has multiple microphones 110 arranged in a circle. The microphones 110 may be omnidirectional or directional. The 6-microphone circular microphone array 102 is only an example. Any number of microphones in a variety of arrangements can be used. In some embodiments the teleconference device 100 may have one or more video cameras 104. If multiple cameras 104 are used, their images may be stitched together to form a single virtual image. The microphone array 102 and the video cameras 104 capture audio (e.g., speech) and video signals of nearby persons 112. In one embodiment, the video cameras 104 are co-located with or part of the device 100.

The teleconference device 100 is also equipped with a loudspeaker 114, possibly many, which may be any of a variety of known devices that can generate sound from a signal. In one embodiment the loudspeaker 114 is at the center of the microphone array 102. The teleconference device 100 receives a sound signal from the far-end device 108 and the loudspeaker 114 generates sound therefrom.

The near-end teleconference device 100 may have a processor, preferably a digital signal processor (DSP), to process the incoming and outgoing audio and video signals. The processor may perform a variety of tasks such as synthesizing the signals from the various microphones 110, performing image-processing algorithms on the video signals, performing speaker-recognition algorithms on incoming video data, performing sound-source localization on audio data from the microphone array 102, cancelling acoustic echo from the sound signal captured by the microphone array 102, among others.

Figure 2:
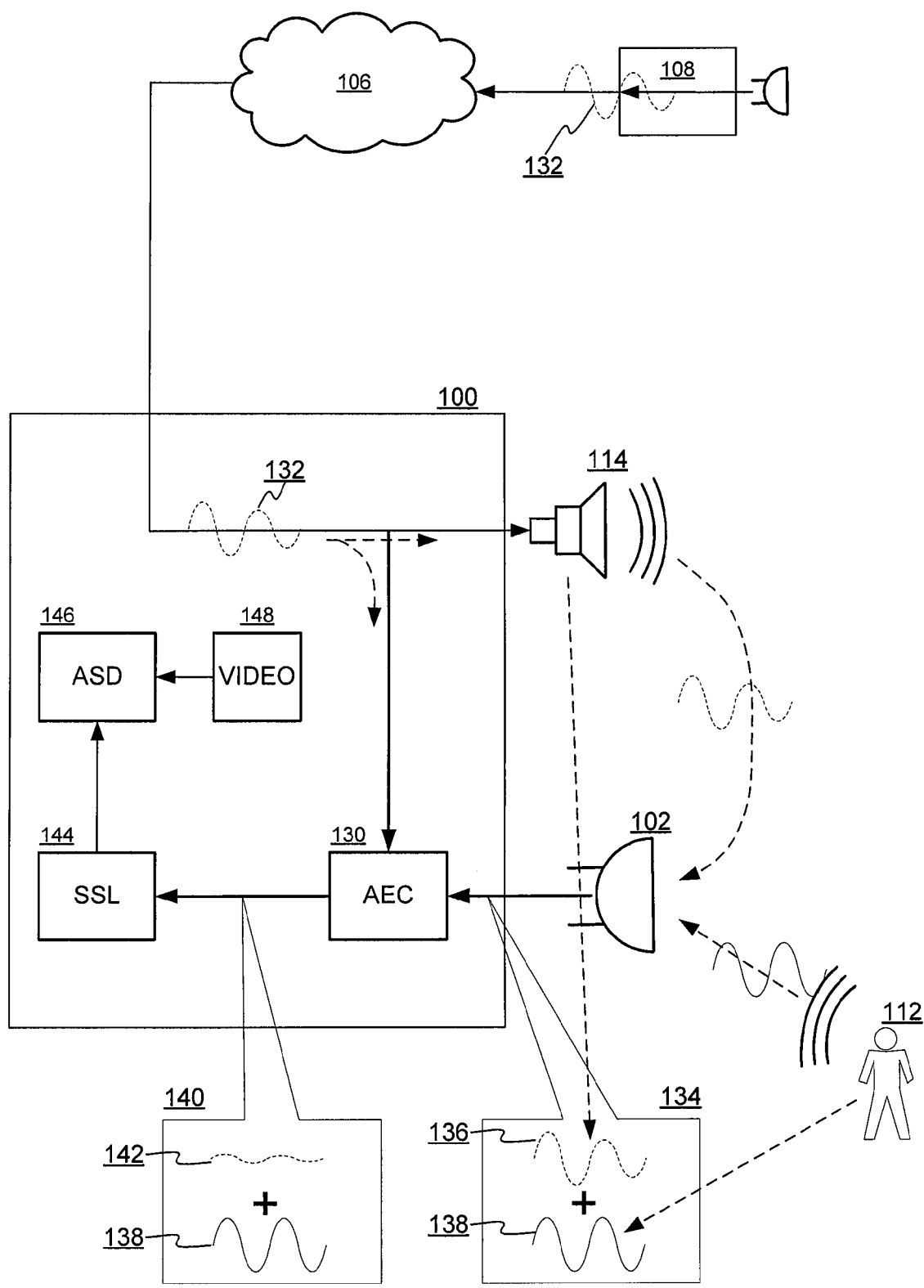
FIG. 2 shows an arrangement of logical functions of a teleconference device.

FIG. 2 shows an arrangement of logical functions of teleconference device 100. As mentioned above, it may be desirable for the teleconference device 100 to be able to play sound from a far-end device 108 and also identify an active speaker among nearby persons 112 using locally captured audio and/or video data. Accordingly, the teleconference device 100 has various modules including an acoustic echo cancellation (AEC) module 130.

The AEC module 130 may be a process running on a DSP or CPU. The microphone array 102 (for illustration, shown only as a single loudspeaker) receives far-end sound from the loudspeaker 114 (playing far-end sound) and near-end sound from one or more nearby persons 112 speaking. Frames of audio data 134 generated from the captured signals of the microphone array 102 therefore contain far-end sound data 136 and near-end sound data 138. Using any of a variety of known echo-cancellation algorithms, the AEC module 130 uses the audio signal 132 received from the far-end device 108 to attenuate the far-end sound data 136, thus outputting frames of echo-cancelled audio data 140 with an attenuated far-end component 142. Note that most acoustic echo cancellation algorithms are imperfect and will have some leakage of far-end audio data.

The teleconference device 100 is also, in some embodiments, provided with a sound-source localization (SSL) module 144. The SSL module 144 receives the frames of echo-cancelled audio data 140 and attempts to determine likely directions of sound therefrom. The general approach used with most microphone arrays is based on time-difference-of-arrival (TDOA), the difference in arrival times of sound over different microphones, which is computed to gauge the likely direction that sound came from. In one embodiment, the SSL module 144 uses the frames of echo-cancelled audio data 140 to compute probability distribution functions (PDFs). A PDF consists of probabilities (or likelihoods), over an angular range which in this example is 360 degrees, but which may be less. Each probability corresponds to a portion of the angular range and the probability for such a portion represents the calculated likelihood that the sound originated from that direction, relative to the microphone array 102. For example, a PDF may have 90 probabilities, corresponding to 4 degree increments spanning 360 degrees (see FIG. 3). Other techniques for sound localization may be used, such as beamforming or other techniques mentioned in U.S. patent application Ser. No. 10/446,924, titled "A System and Process for Robust Sound Source Localization". Further details of sound source localization are available elsewhere.

The teleconference device 100, to provide features such as automatic panning/zooming to active speakers, tracing who said what and when, etc., may include other components such as an active speaker detector (ASD) 146. The ASD 146 may use audio data (e.g., in the form of a PDF from SSL 144) and/or video input from a video processing system 148 which generates video data from the signals of video cameras 104. This data is used to find an active speaker. Active speaker detection algorithms are known and details thereof are available elsewhere.

Typical state of the art echo-cancellation algorithms may remove 20-30 dB of far-end sound, leaving some residual echo in the audio data being generated by the teleconference device 100. That audio, including echo, is sent to the remote device 108 and it may also be used for sound source localization, as discussed further below. For details on how ASD 146 operates, see U.S. patent publication application Ser. No. 11/425,967, titled "Identification Of People Using Multiple Types Of Input".

As seen in FIG. 2, the ASD 146 receives sound localization information such as PDFs from the SSL 144. The ASD 146 may use this sound localization information to help identify an active speaker. However, the leaked far-end sound component 142 received by the SSL 144 can influence the output of the SSL 144. When the far-end component 142 predominates over near-end sound data 138, the SSL 144 can falsely point to the loudspeaker 114 as the source of sound (see pattern in FIG. 3). This can affect the ASD 146, causing it to fail to identify the active speaker or identify as active a person who is not.

Figure 3:
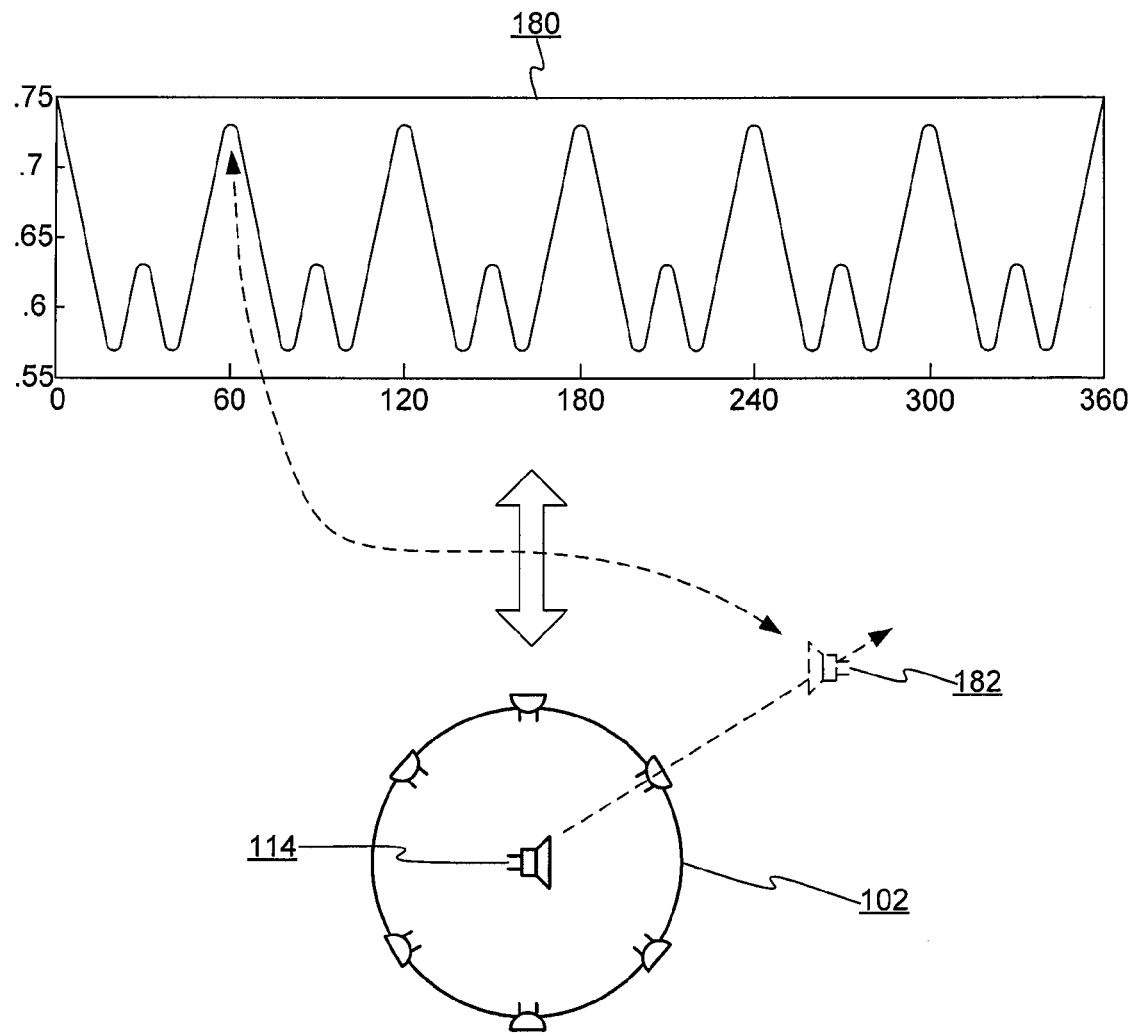
FIG. 3 shows a probability distribution function (PDF) of a circular microphone array with 6 microphones.

FIG. 3 shows a PDF 180 of a circular microphone array 102 with 6 microphones. The horizontal axis is a span of directions from 0 to 360 degrees, around the microphone array 102. The vertical axis is the likelihood or probability that sound originated at a direction of a corresponding direction on the horizontal axis. The PDF 180 is an example of what might be generated by SSL 144 when the microphone array 102 is receiving sound mostly from the loudspeaker 114. As discussed later, other microphone array arrangements might have other PDFs that indicate that sound is mostly coming from one or more loudspeakers. Looking to PDF 180, there are 6 peaks, which may arise as an artifact of the SSL 144's localization algorithms and due to the symmetry of the array-loudspeaker arrangement. Because the SSL 144 expects sounds to originate from outside the microphone array 102, it computes incoming audio data as though the loudspeaker 114 were directly opposite each microphone 110. In other words, the peaks of PDF 180 correspond to directions of six "shadow" sound sources 182 (mirrors of the loudspeaker 114); the six shadow sources being on respective rays projected from the loudspeaker 114 (through the respective microphones 110) but outside the circular microphone array 102.

While the curvature and peaks of the PDF 180 might be specific to a circular array with a central loudspeaker (and even perhaps specific to the sound source localization algorithm selected for use in the SSL 144), the general observation made by the inventors is that there may be a unique PDF that corresponds to, and indicates, a microphone array receiving sound primarily from one or more stationary loudspeakers (or loudspeaker(s) with a known location(s)). While other array and loudspeaker configurations may have different PDFs (see FIG. 4), the general observation that an array-loudspeaker arrangement has a PDF that indicates that loudspeaker sound is predominant can be used to improve performance of the ASD 146. This will be discussed later with reference to FIG. 5.

Figure 4:
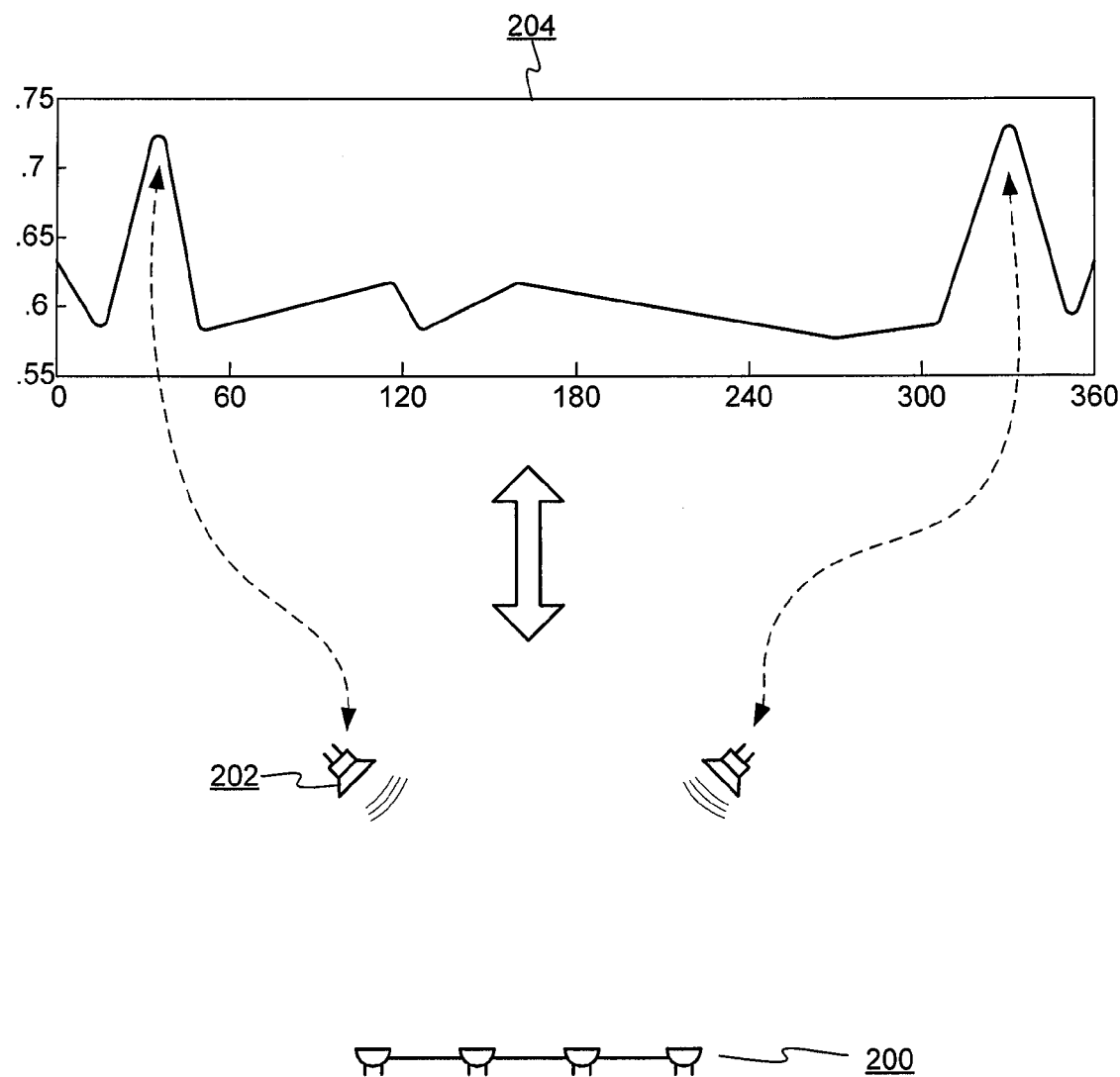
FIG. 4 shows a linear microphone array with two loudspeakers.

FIG. 4 shows a linear microphone array 200 with two loudspeakers 202. The arrangement of FIG. 4 might have a PDF like PDF 204. The peaks of PDF 204 correspond to the directions of the loudspeakers 202 from the microphone array 200. In this simple configuration, as sound from the loudspeakers 202 increases relative to other local sound or noise (if any) PDFs can be expected to become increasingly similar to PDF 204.

Figure 5:
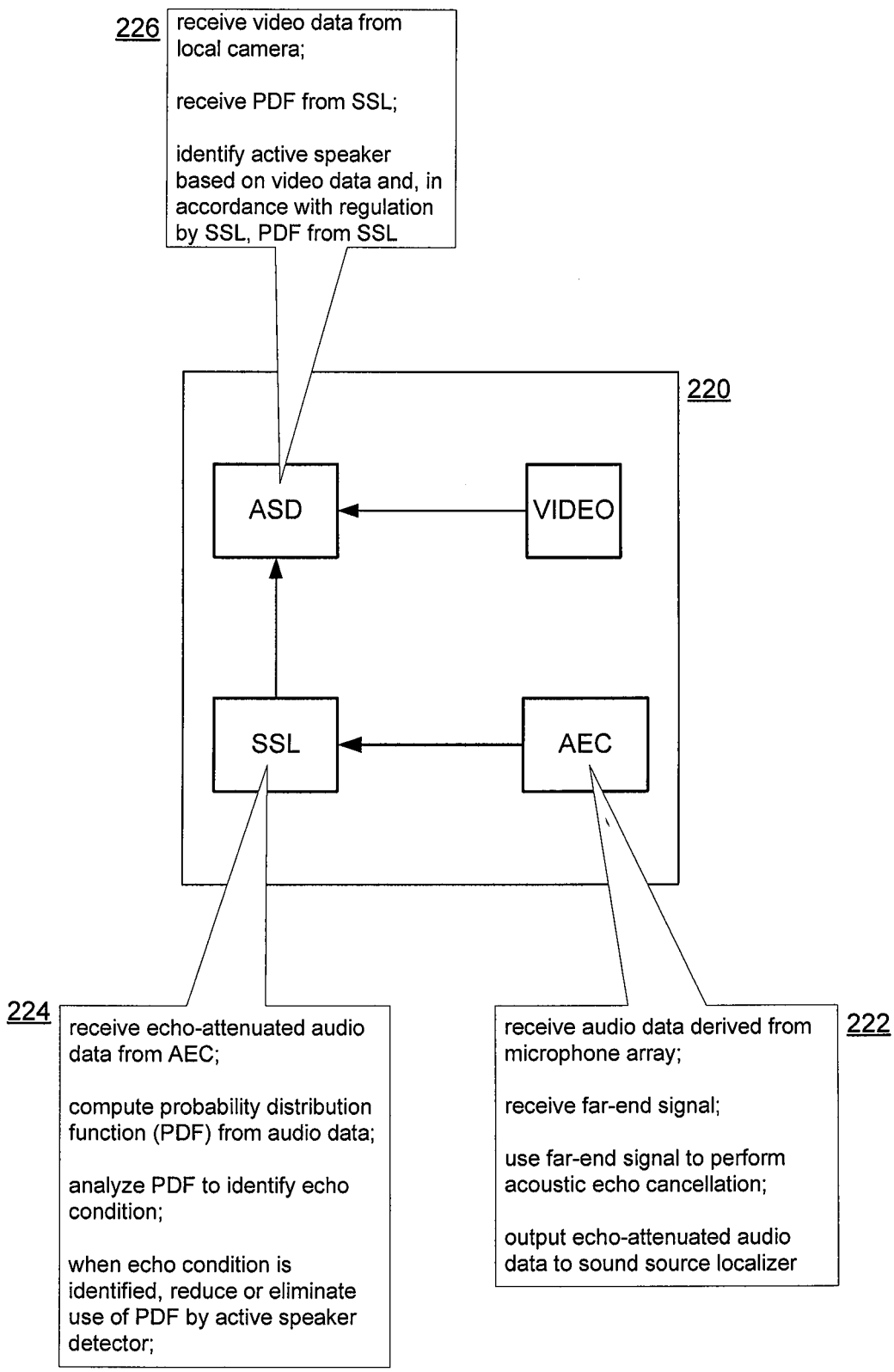
FIG. 5 shows processes for improving active speaker detection for a teleconference device.

FIG. 5 shows processes for improving active speaker detection for a teleconference device 220. An AEC performs a process 222. Process 222 includes receiving near-end audio data derived from a microphone array, typically in the form of frames or timeslices of audio data. The AEC receives far-end audio data, also in the form of frames of audio data. The frames of far-end audio data and near-end audio data are coupled or synchronized in time, such that a frame of near-end audio was captured when a corresponding frame of far-end audio data was played by a near-end loudspeaker. The far-end signal or audio data is used to perform acoustic echo cancellation, which attenuates some, but not all, of the audio data attributable to the loudspeaker. This echo-attenuated audio data is then output to the SSL. The SSL performs a process 224, including receiving the echo-attenuated audio data from the AEC. The SSL computes a PDF from the audio data (as it would for any audio data under the assumption that local sound needs to be localized). The SSL analyzes the PDF to identify an echo condition. In other words, the SSL looks at properties of the PDF to determine whether the microphone array is actually receiving sound mostly from the loudspeaker. In that case, the SSL reduces or eliminates use of the PDF by the active speaker detector (ASD). This may be accomplished in a variety of ways. The SSL may signal the ASD to ignore the SSL's output. The SSL may simply not output a PDF or may output an empty PDF. It should also be noted that the analyzing of the PDF need not occur at the SSL itself. The ASD as well could be configured to analyze incoming PDFs and identify an echo-predominant condition. Assuming that the SSL performs the analysis, the ASD may perform a process 226 of receiving video data derived from one or more local video cameras, receiving a PDF from the SSL, and identifying an active speaker based on the video data and, in accordance with information from the SSL, possibly based also on the PDF. By omitting sound source localization information when sound appears to originate primarily from one or more loudspeakers, false speaker detections can be avoided at the ASD.

In other embodiments, it may be desirable to raise or lower the weight of a PDF (as used in the ASD) based on how similar the PDF is to the echo-predominant PDF pattern. The less similar a PDF is to an echo-predominant PDF pattern, the less weight it is given when used in conjunction with video data to identify an active speaker. While FIG. 6 shows a detailed example of how a PDF might be analyzed, there are benefits of generally regulating or controlling the use of sound source localizer by analyzing the localization information produced thereby.

Figure 6:
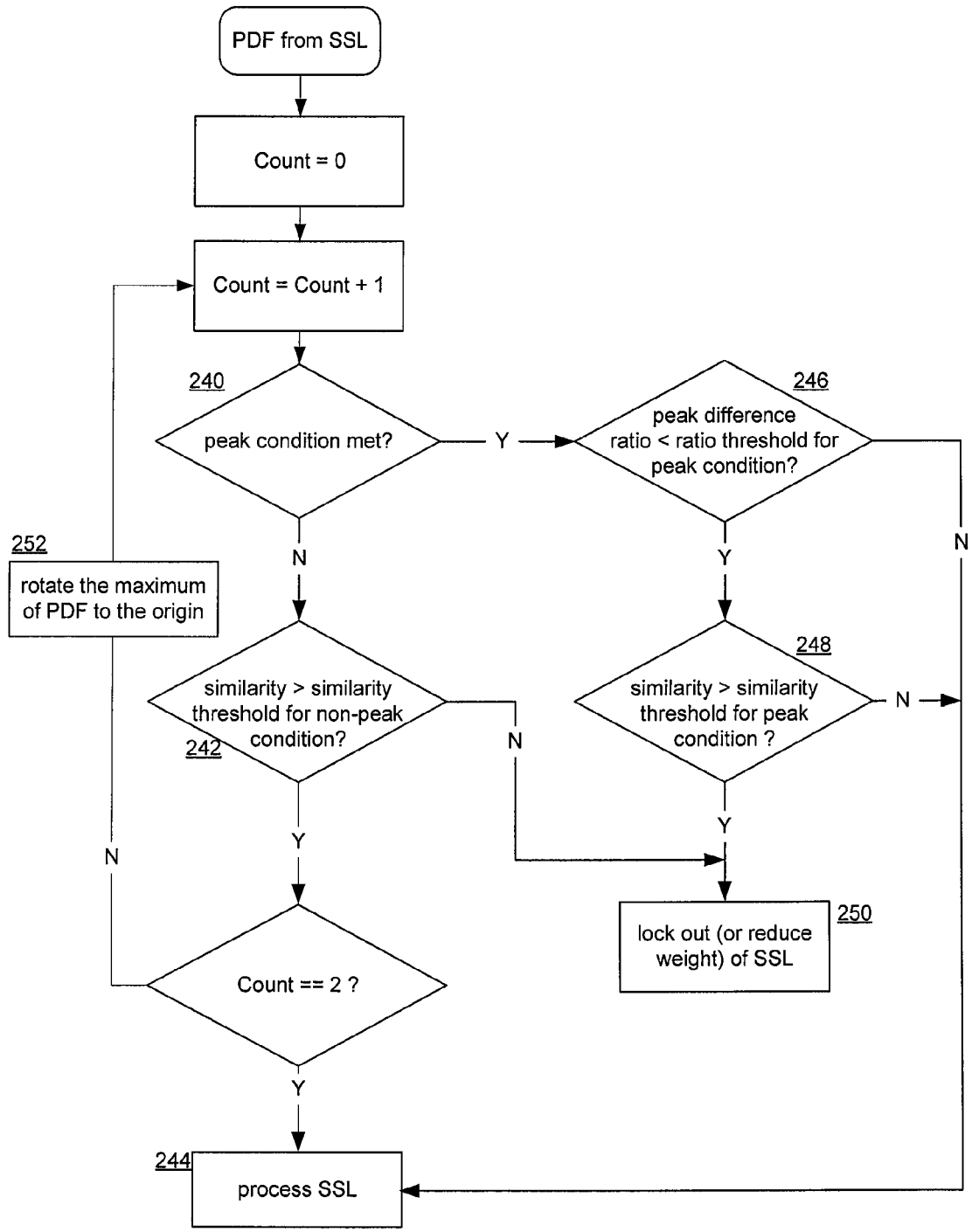
FIG. 6 shows a detailed example process of analyzing a PDF to determine whether to lock out or attenuate sound source localization output in an active speaker detection process.

FIG. 6 shows a detailed example process of analyzing a PDF to determine whether to lock out or attenuate sound source localization output in an active speaker detection process. First a PDF from the SSL is received and it is determined if 240 a peak condition is met where expected. This may involve determining whether the PDF has peaks at or near where they are expected. Referring to the example of FIG. 3, this would involve looking for peaks at 0/360 degrees, 60 degrees, 120, degrees, etc. If 240 the peak condition is not met, there is a check to determine if 242 the similarity of the PDF is greater than a similarity threshold for a non-peak condition. The similarity is how similar a subsection (or an average or mean thereof) of the PDF is to what is expected in an echo-predominant condition. That is, even if 240 the peak condition is not met, it might turn out that the PDF being analyzed has another property such as symmetry that is similar to the echo-predominant PDF. If 242 the similarity is insufficient then the SSL's output, the PDF, is processed 244 by the ASD. If 240 the peak condition is met, then another test is performed. A peak difference ratio is calculated (the difference between the lowest and highest peak, divided by the lowest peak). If 246 the ratio is lower than a threshold condition then the PDF is processed 244. However, if 246 the ratio is higher than the threshold condition the similarity is checked against another threshold. If 248 this threshold is exceeded, then the SSL and/or the PDF is attenuated or locked out, otherwise it is processes 244. Note that if the PDF passes and a decision is made to process the SSL, then the following may also be performed: find the location of the maximum peak of PDF; rotate 252 the PDF and make the maximum peak at the zero degrees point (origin); and repeat steps 240-252.

Again, it should be appreciated that there are many characteristics of a PDF that can be analyzed, any combination of which might be deemed to be sufficient to lockout the SSL. Furthermore, the characteristics will be highly dependent on the exact hardware and arrangement being used. The thresholds will also be dependent on implementation details. The best way to determine characteristics and thresholds is to experiment until the SSL is consistently locked out from the SSL when far-end sound predominates and false identifications are minimized. Furthermore, regardless of the properties or characteristics of a PDF that are examined, a net effect may be that the contribution of sound source localization information to speaker detection will vary as sound received by the microphone array varies; when the microphone array receives much more sound from the loudspeaker than from local persons talking (even after echo cancellation), the contribution of the acoustic active speaker detection process will be reduced or eliminated.

Figure 7:
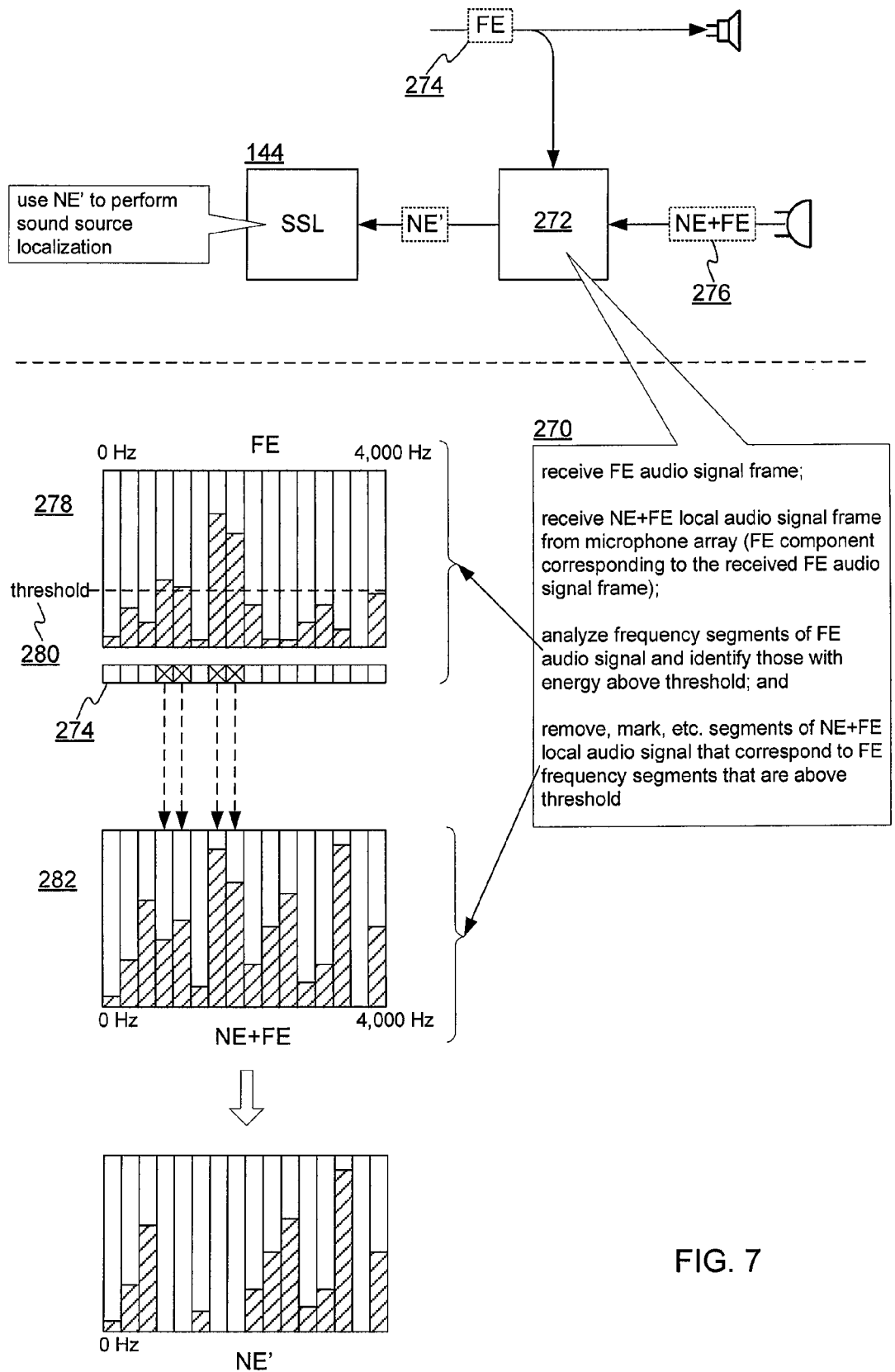
FIG. 7 shows a process for reducing far-end sound data being received by a sound source localizer (SSL).

Selectively Deleting/Ignoring Bands of Far-End Frequency from Audio Data Received from a Microphone Array FIG. 7 shows a process 270 for reducing far-end sound data being received by SSL 144. In this embodiment, a filter 272 selectively filters out frequency bands of far-end sound data before they are processed by the SSL 144. The filter 272 receives a far-end (FE) audio signal frame 274 (having been sent by a far-end teleconference device and also played on the loudspeaker). The filter also receives a near-end audio signal frame 276 ("NE+FE") which contains both original near-end sound data (e.g., voice of persons) and far-end sound data, the far-end sound data resulting from playing of the far-end audio signal frame 274 on the loudspeaker. The frames 274 and 276 are assumed to be coupled or synchronized so that the near-end audio signal frame 276 can be analyzed using the far-end audio signal frame 274.

Having received frames 274 and 276, the filter 272 analyzes frequency segments of far-end audio signal data from frame 274. For example, if the far-end audio signal data spans a frequency range of 0 to 4,000 Hz (may vary per implementation, sampling rate, etc.), the filter 272 might divide the far-end audio signal data into 40 Hz subbands (totaling 100). Spectrogram 278 shows frequency subbands and their energy levels, corresponding to intensity or loudness of far-end sound. Any subbands which have energy above a threshold 280 are marked, for example in a bit vector 282. Process 270 then proceeds to cause corresponding frequency subbands of the audio signal data from the near-end audio signal frame 276 to not be processed by the SSL 144; the frequency subbands are not used in the sound source localization algorithms used by the SSL 144.

Any number of mechanisms can be used to mark or remove frequency subbands from the near-end audio signal data. For example, the bit vector 274 can be passed to the SSL 144 which can use it to ignore marked frequency subbands. The frequency subbands of the near-end audio signal data can simply be zeroed-out in place before being passed to the SSL 144. Regardless of the mechanism used, the near-end audio signal data should be divided into frequency subbands as seen in spectrogram 282.

Threshold 280 is not necessary but can be helpful to minimize the effect of background or system noise. The threshold 280 can be computed on the fly based on average noise level or it can be pre-determined by empirical testing. Different thresholds may be used for different subbands or ranges of subbands. Furthermore, the entire range of frequency (e.g., 0 to 4,000 Hz) need not be subjected to process 270, as it may be the case that only certain ranges of frequency regularly experience overlap of near-end and far-end sound.

Because far-end sound is removed from the audio data provided by the microphone array, most if not all loudspeaker sound is removed from the near-end audio data. The effect is that sound source localization becomes more accurate because it is much less likely to identify the loudspeaker as a sound source. This technique of removing subbands of far-end sound data is useful in an audio-only teleconference system. However, if the SSL 144 is used to supplement an active speaker detection process, then the accuracy will be improved. Finally, it should be noted that the general idea of filtering near-end subbands that have corresponding far-end subbands with energy is beneficial beyond improving sound source localization. For example, the technique can be used to reduce audio echo that the far-end receives. The process 270 is lightweight and can be implemented in almost any stage of an audio system. For example, process 270 could be implemented at a stage where acoustic echo cancellation is performed, or before echo cancellation, or can be integrated with SSL 144.

Subband Voice-Switching

Figure 8:
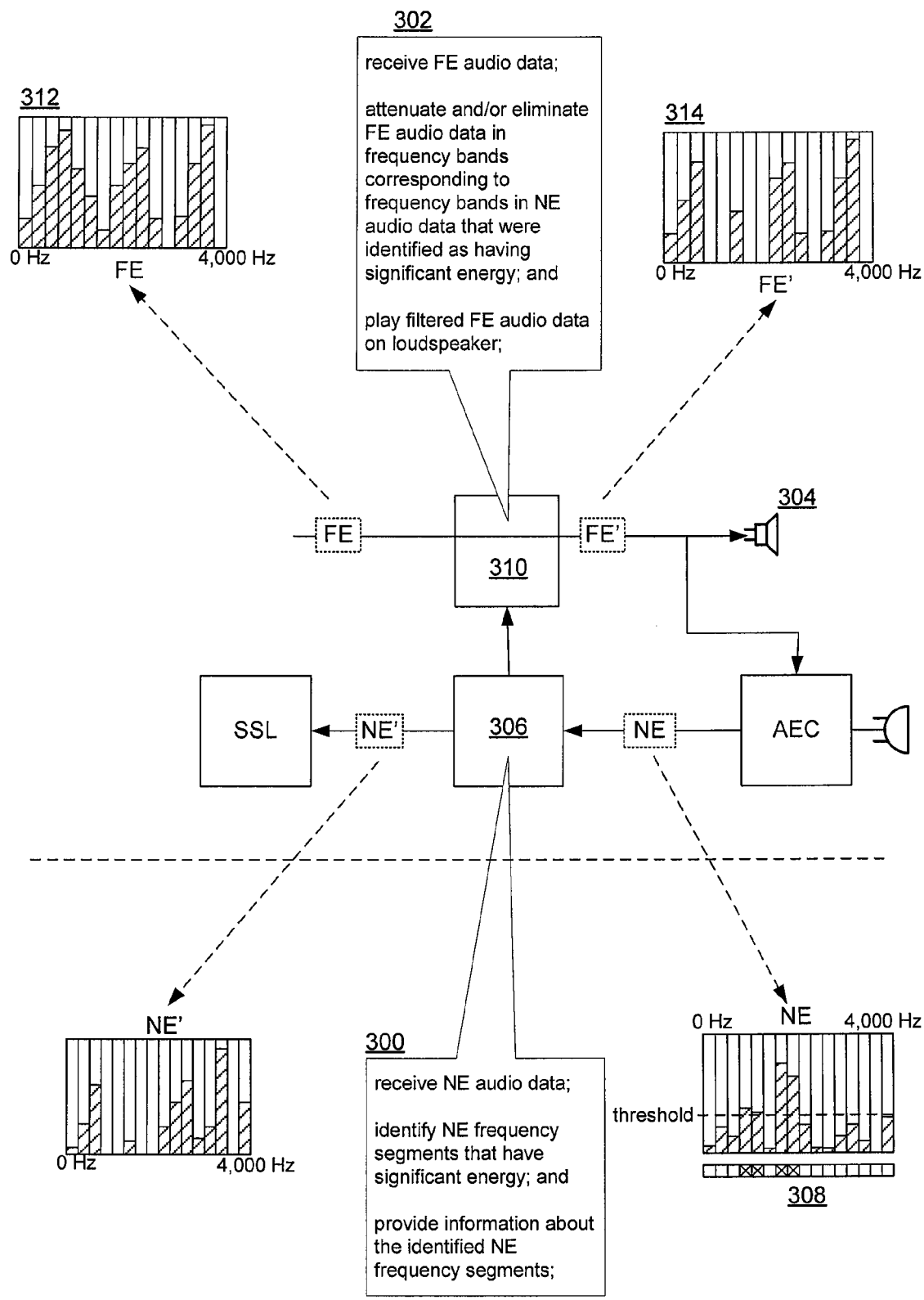
FIG. 8 shows processes for performing subband based voice-switching.

FIG. 8 shows processes 300, 302 for performing subband based voice-switching. Voice-switching is a known technique by which a near-end and far-end alternate between which is transmitting and which is playing back the transmitted data. This prevents acoustic echo but also can create lock-out and creates somewhat artificial conversation between participants. Subband based voice-switching involves attenuating subbands of far-end sound before they are played on a local loudspeaker 304.

A subband analyzer 306 performs process 300, which involves receiving near-end audio data that is relatively clear of far-end audio data. That is, there is little or no acoustic echo present. This might be done using a satellite microphone that is not near the loudspeaker 304. Another approach is to analyze near-end sound at periods of far-end silence (as indicated by lack of audio signal being received from the far-end). Yet another technique is to use statistical models of speech to perform line source separation.

The near-end audio data is segmented into frequency subbands as shown in spectrogram 308. Any subbands that have energy above a threshold are identified, for example by setting bits in a bit vector. Information about the identified near-end frequency segments is provided to an audio component 310. The audio component 310 performs process 302, which involves receiving far-end audio data and segmenting it into frequency subbands (see spectrogram 312) of far-end audio data. Before the far-end audio is played, the portions that correspond to identified near-end frequency subbands (per process 300) are attenuated or removed (see spectrogram 314). The filtered far-end audio data is then played on the loudspeaker 304. The microphone (not necessarily an array) receives near-end sound which includes the filtered far-end sound played on the loudspeaker 304. Because the near-end audio data received from the microphone has subbands with contain either far-end sound or near-end sound, but not both, far-end sound can be readily filtered, reducing echo at the far-end and improving sound source localization if it is to be used.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile or working memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on. Peripheral devices such as cameras, loudspeakers, and microphone arrays can be connected with the computing device.

The invention claimed is:

1. A method of performing voice-switching for periods of doubletalk between a near-end teleconference device and a far-end teleconference device, the method comprising:
   receiving far-end voice data from the far-end teleconference device;
   receiving near-end voice data at the near-end teleconference device;
   identifying frequency subbands of the near-end voice data that have substantial energy; and
   before playing the far-end voice data on one or more loudspeakers of the near-end teleconference device, passing the far-end voice data to an audio unit, the audio unit selectively attenuating or eliminating from the far-end voice data frequency subbands of the far-end voice data that correspond to the identified frequency subbands of the near-end voice data, and wherein the audio unit does not attenuate or eliminate subbands of the far-end voice data that do not correspond to the identified frequency subbands of the near-end voice data.

2. A method according to claim 1, wherein the frequency subbands of the near-end voice data are identified using sound from one or more microphones that are not attached to the near-end teleconference device.

3. A method according to claim 1, wherein the frequency subbands of the near-end voice data are identified by analyzing frames of the near-end voice data that do not have substantial echo from the far-end device.

4. A method according to claim 3, wherein the analyzed frames are selected based on their having been generated during a period when far-end voice data was not being received.

5. A method according to claim 1, further comprising simultaneously playing at least some of the far-end voice data and at least some of the near-end voice data on the one or more loudspeakers and the either or both attenuating or eliminating the far-end voice data frequency subbands prevents the one or more loudspeakers from producing sound in frequency bands which each have both near-end energy and far-end energy.

6. A method according to claim 1, further comprising performing sound source localization on the near-end voice data.

7. A method according to claim 6, further comprising performing active speaker detection using output of the sound source localization.

8. A method according to claim 1, wherein the near-end voice data substantially lacks data contributed by the far-end via the one or more loudspeakers.

9. One or more volatile or non-volatile computer readable media storing information to enable a near-end teleconference system to perform a process, the media not comprising a signal, the process comprising:
receiving over a network frames of far-end audio data from a far-end teleconference device and segmenting the far-end audio data into frequency subbands;
selectively determining, among frequency subbands of near-end audio data, which of the near-end frequency subbands have sound produced by one or more persons speaking at the near-end teleconference system; and
causing the near-end teleconference system, when generating sound from the far-end audio data, to selectively not produce sound for the far-end audio data in the near-end frequency subbands determined to have sound produced by one or more persons speaking at the near-end teleconference system while allowing production of sound for other subbands of the far-end audio data.

10. One or more volatile or non-volatile computer readable media storing information to enable a near-end teleconference system to perform a process according to claim 9, wherein the near-end frequency subbands are identified by analyzing audio data from a microphone of the near-end teleconference system.

11. One or more volatile or non-volatile computer readable media storing information to enable a near-end teleconference system to perform a process according to claim 10, wherein the near-end audio data is segmented into frequency subbands, and the frequency subbands of sound produced by one or more persons speaking at the near-end teleconference system are identified based on sound energy levels indicated by the segmented frequency bands of the near-end audio data.

12. One or more volatile or non-volatile computer readable media storing information to enable a near-end teleconference system to perform a process according to claim 9, wherein the causing the near-end teleconference system to not produce sound in the frequency subbands determined to have sound produced by one or more persons speaking at the near-end teleconference system comprises attenuating and/or eliminating portions of the far-end audio data based on the portions being in the frequency subbands determined to have sound produced by one or more persons speaking at the near-end teleconference system.

13. One or more volatile or non-volatile computer readable media storing information to enable a near-end teleconference system to perform a process according to claim 12, wherein the portions of the far-end audio data that are attenuated and/or eliminated changes over time as different near-end frequency subbands are identified.

14. One or more volatile or non-volatile computer readable media storing information to enable a near-end teleconference system to perform a process according to claim 9, the process further comprising performing sound source localization on a frame of audio data captured with a microphone array of the near-end teleconference system where the captured audio data comprises frequency subbands that contain only near-end energy, frequency subbands that contain only far-end energy, and substantially lacks frequency subbands that contain both near-end and far-end energy.

15. A method performed by teleconference system, the method comprising:
repeatedly evaluating portions of local voice sound to repeatedly determine respective subsets of frequency bands of local voice sound that have energy originating from a person speaking near a microphone array, wherein as the local voice sound changes the frequency bands determined for the subsets change accordingly, the local voice sound produced by the person speaking; and
repeatedly performing subband-specific loudspeaker voice-switching on portions of far-end voice data being received from a remote teleconference system by selectively attenuating or blocking from being played on a loudspeaker only those frequency bands of the portions of far-end voice data that correspond to the identified frequency bands in the respective subsets of frequency bands.

16. A method according to claim 15, the method further comprising obtaining voice data corresponding to the local voice sound from a satellite microphone separate from the microphone array, and using the voice data to identify the frequency bands of voice sound.

17. A method according to claim 15, wherein during doubletalk between the teleconference system and the remote teleconference system the selective blocking allows the teleconference system to simultaneously receive on its microphone array combined sound comprising both the local voice sound and sound from a loudspeaker playing the selectively blocked far-end voice data, where the frequency bands that make up the combined sound contain either substantially only local voice sound or substantially only sound from the loudspeaker.

18. A method according to claim 17, the method further comprising performing sound source localization on only the frequency subbands of the combined sound that contain local voice sound.

19. A method according to claim 15, wherein the frequency subbands that are selectively blocked and/or attenuated change to match changes in the frequency bands of local voice sound that are identified.

20. A method according to claim 19, further comprising performing echo cancellation on audio data received from the microphone.

21. A method according to claim 1, wherein either the near-end teleconference device or the far-end teleconference device comprises a mobile wireless device.

22. A method according to claim 1, wherein a frequency subband of the near-end voice data is determined by have substantial energy by evaluating an amplitude of the frequency subband.

23. One or more volatile or non-volatile computer readable media according to claim 9, wherein the near-end teleconference system comprises a mobile wireless device.

24. One or more volatile or non-volatile computer readable media according to claim 9, wherein a frequency subband of near-end audio data is determined to have sound by comparing a feature of the frequency subband with a threshold to determine whether the feature satisfies the threshold.

25. A method according to claim 15, wherein the teleconference device comprises a mobile cellular device.

26. A method according to claim 15, wherein a frequency band of local voice sound is determined to have sufficient energy if it has any amount of energy.

27. A method according to claim 15, wherein a frequency band of local voice sound is determined to have sufficient energy if it has an amount of energy that satisfies a threshold.

* * * * *